3,293,157
PROCESS FOR ELECTROLYTIC SILVERING
George I. Facsko, Ioan Radoi, and Roland Minges, Timisoara, Rumania, assignors to Ministerul Invatamintului, a corporation of Rumania
No Drawing. Filed Apr. 22, 1963, Ser. No. 284,766
3 Claims. (Cl. 204—46)

Electrolytic silvering (silver-plating) is presently carried out in silver cyanide baths. The attempts to obtain suitable galvanic coatings by means of other soluble silver salts have not given satisfactory results.

Besides their great toxicity the silver cyanide baths present also the inconvenience of being contaminated by heavy metals, and in addition their components are very difficult to regenerate.

The present invention consists of an electrolytic silvering process employing non-toxic soluble silver salts and which also avoids the disadvantages of the known processes.

According to the present invention for the preparation of silvering baths there are used soluble silver salts brought to an alkaline pH-value and maintained in solution by means of an organic compound which contains a sulphonamidic group.

For the realization of the bath the 4-sulphon-amidobenzoic acid (4-S-B), which is obtained as a waste-product in great amounts in the production of saccharine, is preferably used. This substance forms with the silver ion in neutral medium a difficultly soluble compound which dissolves on alkalinization by forming a complex combination. In the silvering bath the ratio of 4-S-B to silver must be at least 1:1, but it can be greater. The bath alkalinity must have at least the value which ensures the dissolution of the difficultly soluble compound, but the bath operates also at a higher alkalinity.

The silvering bath, according to the present invention, has the quality of not being contaminated by the usual metals which precipitate under the bath conditions. It is also regenerated with great ease, for instance by precipitating the silver as chloride and the 4-S-B acid by acidulation with hydrochloric acid.

In the silvering bath according to the present invention, there can be used current densities usually applied in cyanide baths (0.1–0.3 a./dm.$^2$), and even higher. The silver coating is obtained in good yields (over 95%); it is compact, adherent and polishable. The dispersion capacity of the bath is very satisfactory. The obtained silverplating is absolutely equivalent to that obtained in silver cyanide baths.

Hereunder follow several examples for preparing silvering baths employing 4-S-B acid.

*Example 1*

36 g. of 4-S-B acid are suspended in water and neutralized with the required quantity of a concentrated solution of sodium hydroxide. Under stirring there are added 31 g. of silver nitrate in the form of a concentrated solution which precipitates the difficultly soluble silver salt of the 4-S-B acid. Further stirring follows the addition of additional sodium hydroxide until the formed precipitate is redissolved. The solution is then made up to a liter.

*Example 2*

40 g. of 4-S-B acid are suspended in water and neutralized with the required quantity of a concentrated solution of sodium hydroxide. Under stirring there are added 31 g. of silver nitrate in the form of a concentrated solution which precipitates the difficultly soluble silver salts of the 4-S-B acid. Further stirring follows the addition of additional sodium hydroxide until the formed precipitate is redissolved. The solution is made up to a liter.

*Example 3*

50 g. of 4-S-B acid are suspended in water and neutralized with the required quantity of a concentrated solution of sodium hydroxide. Under stirring there are added 40 g. of silver nitrate in the form of a concentrated solution which precipitates the difficulty soluble silver salt of the 4-S-B acid. Further stirring follows the addition of additional sodium hydroxide until the formed precipitate is redissolved. The solution is then made up to a liter.

*Example 4*

55 g. of 4-S-B acid are suspended in water and neutralized with the required quantity of a concentrated solution of sodium hydroxide. Under stirring there are added 40 g. of silver nitrate in the form of a concentrated solution which precipitates the difficultly soluble silver salt of the 4-S-B acid. Further stirring follows the addition of additional sodium hydroxide until the formed precipitate is redissolved. The solution is then made up to a liter.

In comparison with the known processes the new one presents the following advantages:

(a) The bath and the compounds from which it is prepared are non-toxic.

(b) The 4-sulphon-amido-benzoic acid (4-S-B acid) is an inexpensive product.

(c) The bath is not contaminated during the operation.

(d) The bath components are easily regenerated.

We claim:

1. Method of silver plating, which comprises passing an electric current from an anode through an aqueous alkaline solution of a soluble silver salt to a body to be plated which serves as the cathode, said solution containing 4-sulfonamidobenzoic acid and silver ions in a ratio of at least 1:1.

2. Bath for silver plating, said bath consisting essentially of an aqueous alkaline solution of 4-sulfonamidobenzoic acid and silver ions in a ratio of at least 1:1.

3. Bath according to claim 2 in which said silver salt is silver nitrate.

References Cited by the Examiner
UNITED STATES PATENTS

| | | | |
|---|---|---|---|
| 2,355,070 | 8/1944 | Harford | 204—46 X |
| 2,384,300 | 9/1945 | Harford | 204—55 |
| 2,660,554 | 11/1953 | Ostrow | 204—46 X |

JOHN H. MACK, *Primary Examiner.*

WINSTON A. DOUGLAS, G. KAPLAN, *Assistant Examiners.*